US008466962B2

(12) United States Patent
Hutchison

(10) Patent No.: US 8,466,962 B2

(45) Date of Patent: Jun. 18, 2013

(54) TRAFFIC SIGNAL WITH INTEGRATED SENSORS

(75) Inventor: Michael Cole Hutchison, Plano, TX (US)

(73) Assignee: M&K Hutchison Investments, LP, Plano, TX (US)

(*) Notice: Subject to any disclaimer, the term of this patent is extended or adjusted under 35 U.S.C. 154(b) by 1720 days.

(21) Appl. No.: 11/772,064

(22) Filed: Jun. 29, 2007

(65) Prior Publication Data

US 2008/0158354 A1 Jul. 3, 2008

Related U.S. Application Data

(63) Continuation-in-part of application No. 11/211,029, filed on Aug. 24, 2005, now Pat. No. 7,327,281.

(51) Int. Cl.
*H04N 7/18* (2006.01)

(52) U.S. Cl.
USPC ............ 348/148; 348/143; 348/149; 382/102

(58) Field of Classification Search
USPC ........................... 348/149, 148, 143; 382/104
See application file for complete search history.

(56) References Cited

U.S. PATENT DOCUMENTS

| | | | | |
|---|---|---|---|---|
| 3,729,706 | A | 4/1973 | Hein | |
| 4,166,043 | A * | 8/1979 | Uhlmann et al. | 252/600 |
| 5,153,618 | A * | 10/1992 | Frank et al. | 347/125 |
| 6,121,898 | A * | 9/2000 | Moetteli | 340/933 |
| 6,269,227 | B1 * | 7/2001 | Hamasaki et al. | 396/534 |
| 6,392,704 | B1 * | 5/2002 | Garcia-Ortiz | 348/373 |
| 6,466,260 | B1 * | 10/2002 | Hatae et al. | 348/149 |
| 6,466,862 | B1 * | 10/2002 | DeKock et al. | 701/117 |
| 2001/0055072 | A1 * | 12/2001 | Mogamiya et al. | 348/335 |
| 2005/0030203 | A1 | 2/2005 | Sharp et al. | |
| 2005/0099319 | A1 | 5/2005 | Hutchison et al. | |
| 2005/0174445 | A1 * | 8/2005 | Yamashina | 348/231.7 |
| 2007/0013552 | A1 | 1/2007 | Povey et al. | |
| 2007/0052553 | A1 | 3/2007 | Hutchison | |
| 2007/0069920 | A1 | 3/2007 | Hakki et al. | |

* cited by examiner

*Primary Examiner* — Alina N Boutah
*Assistant Examiner* — Adam Cooney
(74) *Attorney, Agent, or Firm* — Yee & Associates, P.C.

(57) ABSTRACT

An apparatus for integrating sensors with a traffic signal. A camera is operably disposed within a housing. The housing is attached to an object such that the camera can observe traffic flowing past a traffic signal. A visor is attached to the housing such that an optical aperture of the camera is covered by the visor, wherein the visor comprises a roof having an angle that slopes, relative to the housing, towards the optical aperture, wherein the visor further comprises a floor connected to the roof, and wherein the floor extends outwardly from the housing.

4 Claims, 9 Drawing Sheets

TRAFFIC SIGNAL WITH INTEGRATED SENSORS

RELATED CASES

This application is a continuation-in-part application of application Ser. No. 11/211,029 filed Aug. 24, 2005, now U.S. Pat. No. 7,327,281, now U.S. Patent Application Publication 2007/0052553.

BACKGROUND OF THE INVENTION

1. Technical Field

The present invention relates generally to traffic signals and public lamps. Still more particularly, the present invention relates to a traffic signal and public lamps having one or more sensors integrated with a housing.

2. Description of Related Art

Traffic signals for directing traffic at road intersections are ubiquitous and have been known for decades. More recently, traffic signal cabinets have been equipped with communications equipment that allows local law enforcement, fire departments, and various government agencies to better optimize the control of traffic signals. In addition, cameras and microphones have been located at various points at intersections to monitor traffic, detect violations of traffic laws, and generally monitor intersections for criminal activity. As used herein, the term "traffic signals" includes both traditional traffic signals, pedestrian crossing signals, railroad crossing signals, boating signals, and other signals useful for controlling the flow of vehicles and pedestrians.

Various government agencies responsible for maintaining intersections and traffic signals are interested in further increasing the ability to monitor intersections. For example, agencies responsible for civil defense are interested in adding nuclear, biological, or chemical sensors at intersections because the communications infrastructure required to coordinate so many of these sensors is likely to already be in place. However, the cost of many of these sensors can be high, especially because the sensors must be resistant to weather, vandalism, and other dangers. Thus, it would be advantageous to have an improved apparatus for providing a variety of sensors at traffic intersections.

SUMMARY OF THE INVENTION

The present invention provides an apparatus for integrating sensors with a traffic signal. A camera is operably disposed within a housing. The housing is attached to an object such that the camera can observe traffic flowing past a traffic signal. A visor is attached to the housing such that an optical aperture of the camera is covered by the visor, wherein the visor comprises a roof having an angle that slopes, relative to the housing, towards the optical aperture, wherein the visor further comprises a floor connected to the roof, and wherein the floor extends outwardly from the housing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
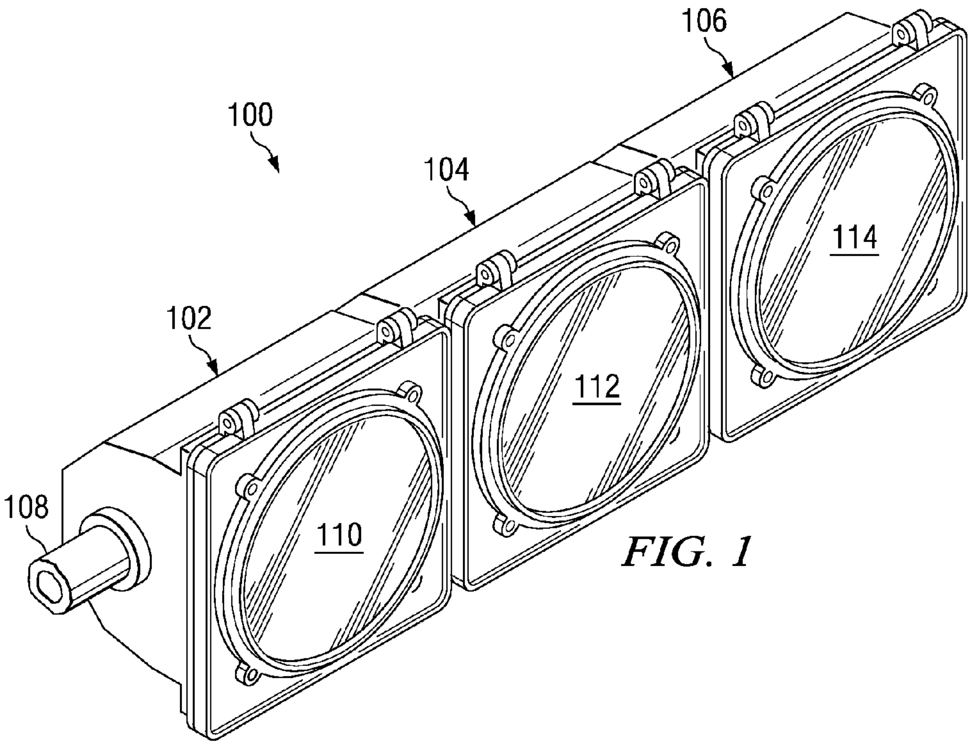
FIG. 1 shows a traffic signal in accordance with an illustrative embodiment of the present invention.

With reference now to the figures, FIG. 1 shows traffic signal 100 in accordance with an illustrative embodiment of the present invention. Traffic signal 100 includes three signal cases, such as signal cases 102, 104, and 106. These signal cases are connected to each other via rod 108. Rod 108 is attached to a traffic signal pole, wire, or other support, not shown, such that drivers can see traffic signal 100. Wires, cables, or other means for transferring power and data signals are attached to signal cases 102, 104, and 106, with wires or cables possibly routed through rod 108.

Each signal case includes a lens, such as lenses 110, 112, and 114, through which light is emitted. Each lens is provided with an appropriate color, such as red, yellow, and green, respectively, and possibly a mask, such as an arrow.

Traffic signal 100 may take a variety of forms. For example, more or fewer signal cases may be provided. Even one signal case may be utilized as a traffic signal. One or more signal cases, such as signal cases 102, 104, and 106, may be placed inside of a traffic light casing, as opposed to being connected together via rod 108. In addition, each signal case may be provided and deployed separately, such that a traffic light casing or rod is not required. Thus, the mechanism of the present invention may be provided in a wide variety of traffic light arrangements other than those shown. The particular arrangement of signal cases 102, 104, and 106 is present for purposes of illustration and not meant to imply architectural limitations as to the number or arrangement of different signal cases.

Figure 2:
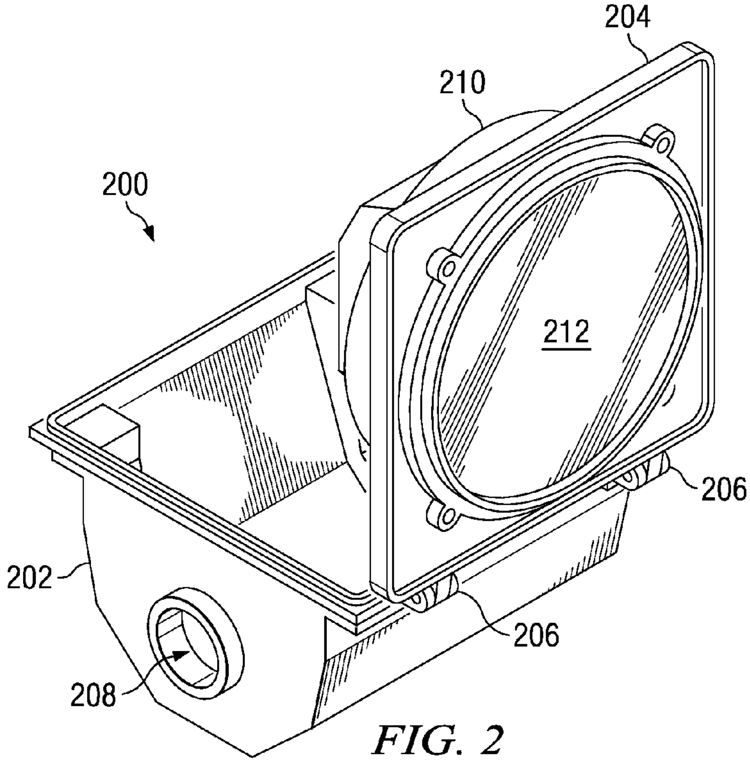
FIG. 2 shows a signal case for use in the traffic signal shown in FIG. 1 in accordance with an illustrative embodiment of the present invention.

FIG. 2 shows a signal case for use in the traffic signal shown in FIG. 1 in accordance with an illustrative embodiment of the present invention. In this example, signal case 200 includes housing 202 and door 204. Door 204 also may be referred to as a lid, top, or cap. Although door 204 is connected to housing 202 via hinges 206, door 204 may be connected to housing 202 via any suitable method. For example, door 204 may be rotatably attached to housing 202, slidably attached to housing 202, screwed to housing 202, bolted to housing 202, adhered to housing 202, twistably attached to housing 202, and may be otherwise removably attachable to housing 202. In addition, one or more latches, brackets, screws, bolts, or other attachment means, not shown, may be used to secure door 204 to housing 202.

In the illustrative examples, door 204 is operably attached to housing 202 to allow access to the interior of housing 202. By being operably attached to housing 202, door 204 may be opened or otherwise removed to reveal the interior of housing 202. In another illustrative example, door 204 may instead be permanently attached to housing 202 such that door 204 becomes one of the sides of housing 202. Slot 208 is optionally provided, should signal case 200 take the form of one of the signal cases shown in FIG. 1.

Signal case 200 also includes light source module 210, which contains a light source. In an illustrative example, the light source is a solid-state light emitting diode array, such as that shown in Hutchison, Modular Upgradable Solid State Light Source for Traffic Control, U.S. Pat. No. 6,426,704 (Jul. 30, 2002). However, the light source may be an incandescent bulb or any other suitable light source. Photons emitted by the light source travel through lens 212 and thereafter may be sensed. In the depicted examples, door 204 is configured such that photons generated by the light source may be sensed outside housing 202. Thus, a driver can see light emitted through lens 212. As described above, lens 212 may be a variety of colors, such as red, yellow, green, and may be provided with a mask or silhouette, such as an arrow for indicating direction of traffic flow.

Figure 3:
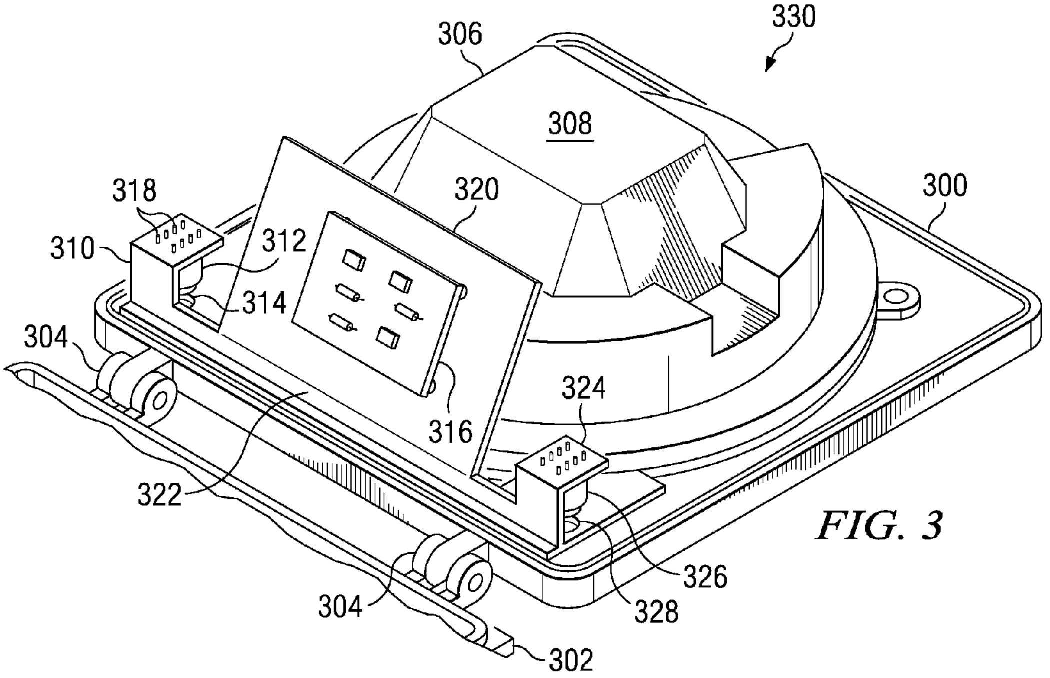
FIG. 3 is a diagram of an inside view of a door from FIG. 2 in accordance with an illustrative embodiment of the present invention.

In FIG. 3, a diagram of an inside view of a door from FIG. 2 is depicted in accordance with an illustrative embodiment of the present invention. Door 300 shows the inside portion of door 204 in FIG. 2. In this example, door 300 is rotatably attached to housing 302 via hinges 304. Similarly, light source module 306 is attached to door 300, with a light source, not shown, disposed on the opposite side of light source module surface 308.

In addition, tab 310 is attached to door 300. Sensor 312 is attached to tab 310, though sensor 312 may be disposed elsewhere on door 300, within housing 302, or may be disposed outside signal case 330, such as in a separate housing attached to housing 302. Depending on the type of sensor used, aperture 314 may be placed in door 300 in any suitable manner that sensor 312 may be used. For example, if sensor 312 is a camera, then aperture 314 is configured such that light may travel from outside door 300 into the camera. In another example, if sensor 312 is a microphone, then aperture 314 may instead take the form of a cluster of small apertures instead of a single large aperture, as shown. The cluster of small apertures allows the microphone to more easily detect or sense sound waves from sources outside signal case 330, while protecting the microphone. In another example, if sensor 312 is a biological sensor, then aperture 314 may be a cluster of small apertures, a mesh, or a filter. Furthermore, a small fan may be attached to door 300, or otherwise provided in signal case 330, to draw outside air through door 300 and into the biological sensor. On the other hand, if sensor 312 is a nuclear sensor designed to detect or sense gamma rays, then aperture is not needed when housing 302 is made of plastic. Hence, at least one of housing 302 or door 300 may be adapted to allow the sensor to sense a parameter outside the housing. The term “sense” as used herein means to detect, sense, measure, or record a parameter. The parameter may be anything that can be detected, measured, or recorded by a sensor, such as light color or intensity, or any other kind of parameter in the case of different kinds of sensors, such as a radiation count or other parameters.

In this illustrative example, sensor 312 is disposed such that sensor 312 is located wholly inside housing 302 when door 300 is shut to provide maximum protection to sensor 312. However, a portion of sensor 312 may extend through aperture 314, if necessary or desirable for operation of sensor 312.

In addition to sensor 312, control board 316 may be provided to control operation of sensor 312. Control board 316 is operably connected to sensor 312 by any suitable means, such as via wires connected to pins 318, via a wireless connection, or by any other suitable method. By being operably connected to sensor 312, control board 316 is connected to sensor 312 in such a way that control board 316 may control the operation of sensor 312. Control board 316 may be a circuit board, computer card, or any suitable hardware and software for controlling sensor 312.

In turn, control board 316 is attached to backboard 320. Backboard 320 is attached to door 300. In this manner, control board 316 is attached to door 300 through its attachment to backboard 320. In these examples, backboard 320 provides a convenient surface to mount control board 316. However, control board 316 may be otherwise attached to other components in other locations, such as door 300, light source module 306, housing 302, or within housing 302 of signal case 330. In other illustrative examples, control board 316 may be placed in a separate protective housing disposed outside housing 302.

One or more of control board 316 and sensor 312 may be connected to a communications center and a power source via wired or wireless communications methods. The communications center allows a user to remotely control sensor 312 and to remotely gather data from sensor 312. Thus, for example, a user may monitor video or pictures from sensor 312 in the form of a camera. In another illustrative example, control board 316 may include one or more forms of non-volatile memory for storing data. Thus, pictures or other data may be stored in signal case 330 for later retrieval. Data may be retrieved directly by directly connecting to the non-volatile memory, or remotely via the communications center.

In addition, multiple sensors and tabs may be provided. For example, second tab 324 may be attached to door 300 and second sensor 326 may be attached to second tab 324. Second aperture 328 may also be provided, if necessary or desirable for the operation of second sensor 326. Second tab 324 and second sensor 326 may be sized, dimensioned, arranged, and may otherwise operate as described with respect to tab 310 and sensor 312.

In these illustrative examples, frame 322 is present. Tab 310, and optionally backboard 320, control board 316, second tab 324, and second sensor 326 may be attached to or otherwise be a part of frame 322. Frame 322 allows existing signal cases to be easily fitted with one or more sensors. Thus, in an existing signal case without sensors, door 300 may be opened, frame 322 attached to door 300 or housing 302 using screws, adhesives or other suitable methods, and apertures 314 and 328 drilled. Frame 322 may be removably attachable to door 300 or housing 302 such that frame 322 may be easily replaced.

Frame 322 may have a variety of shapes and dimensions, depending on the number and type of sensors used and the desired location of sensors within signal case 330. Frame 322 may extend over light source module 306 and may completely cover light source module 306. In this case, frame 322 may provide multiple tabs and may provide multiple mounting surfaces for multiple sensors and multiple control boards. In another illustrative example, frame 322 may be adjustable or one or more portions of frame 322 may be adjustable to allow easier access to sensors or control boards. As used herein, the term adjustable means flexible, movable, moldable, or otherwise capable of being adjusted such that a user may manipulate the frame or tab.

In other illustrative examples, one or more sensors may be attached to door 300 or housing 302 using tabs or other means, with control functions for the sensors provided at the communications center. Thus, control board 316 is optional. Likewise, tab 310 is optional if some other means is used to mount sensor 312 to door 300 or housing 302.

Figure 4:
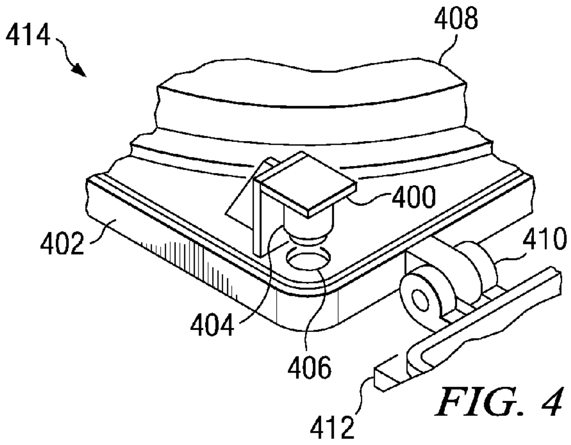
FIG. 4 shows a camera attached to a tab that is, itself, attached to the door of the signal case shown in FIG. 2 in accordance with an illustrative embodiment of the present invention.

FIG. 4 shows a camera attached to a tab that is, itself, attached to the door of the signal case shown in FIG. 2 in accordance with an illustrative example of the present invention. Tab 400 is attached to door 402. Sensor 404 is attached to tab 400 opposite aperture 406. Light source module 408, hinge 410, and housing 412 are shown for reference.

Tab 400 may take a variety of shapes and forms and may be disposed on door 402 in any suitable manner. For example, tab 400 may be an L-shaped bracket integrally formed with door 402, as shown in FIG. 4. In this case, the base of sensor 404 is attached to the seat of the L-shaped bracket so that sensor 404 faces aperture 406. Therefore, tab 400 is a mounting surface for sensor 404. Tab 400 may be adjustable such that a person may manipulate tab 400 to provide access to sensor 404. Thus, tab 400 may be flexible such that a person may bend tab 400 to gain easy access to sensor 404. In another example, tab 400 may be manufactured separately and attached to door 402 in the manner shown. In another example, tab 400 may have a different shape that accommodates a particular type or shape of sensor 404. In yet another example, tab 400 is part of a frame, such as frame 322 in FIG. 3, to which the sensor control board may also be attached. Thus, in signal cases that do not already have tabs or control boards, a frame may be quickly and easily attached to door 402. The frame includes tab 400, sensor 404, and a control board, and may include additional tabs and additional sensors.

In addition, sensor 404 may be a variety of sensors. For example, sensor 404 may be a nuclear sensor, a chemical sensor, a bacteriological sensor, an audio sensor, a motion sensor, a thermometer, or a moisture sensor. In each case, any suitable sub-type of sensor may be used. For example, a nuclear sensor can be used to detect or sense alpha particles, beta particles, or high energy photons. A chemical sensor can be designed to detect or sense chemical weapons, such as sarin, soman, or VX gas, or to detect or sense other compounds, such as nitrates, TNT, or other explosives. A bacteriological sensor can be utilized to detect or sense various bacteria, such as anthrax, staff, or other bacteria. An audio sensor may be a microphone and may be a directional microphone. A motion sensor may sense the motion of cars or pedestrians. A thermometer may track the temperature of the surrounding area. A moisture sensor can sense the humidity or even rainfall levels in the area of the sensor.

In addition, any other sensor may be used to implement sensor 404, so long as the particular sensor is sized and dimensioned to fit within signal case 414 and is sufficiently durable to survive conditions inside signal case 414. Furthermore, multiple sensors may be provided. Thus, signal case 414 may include one or more arrays of different kinds of sensors. Each sensor may be disposed on a tab, or may be otherwise attached to door 402, light source module 408, or housing 412.

Figure 5:
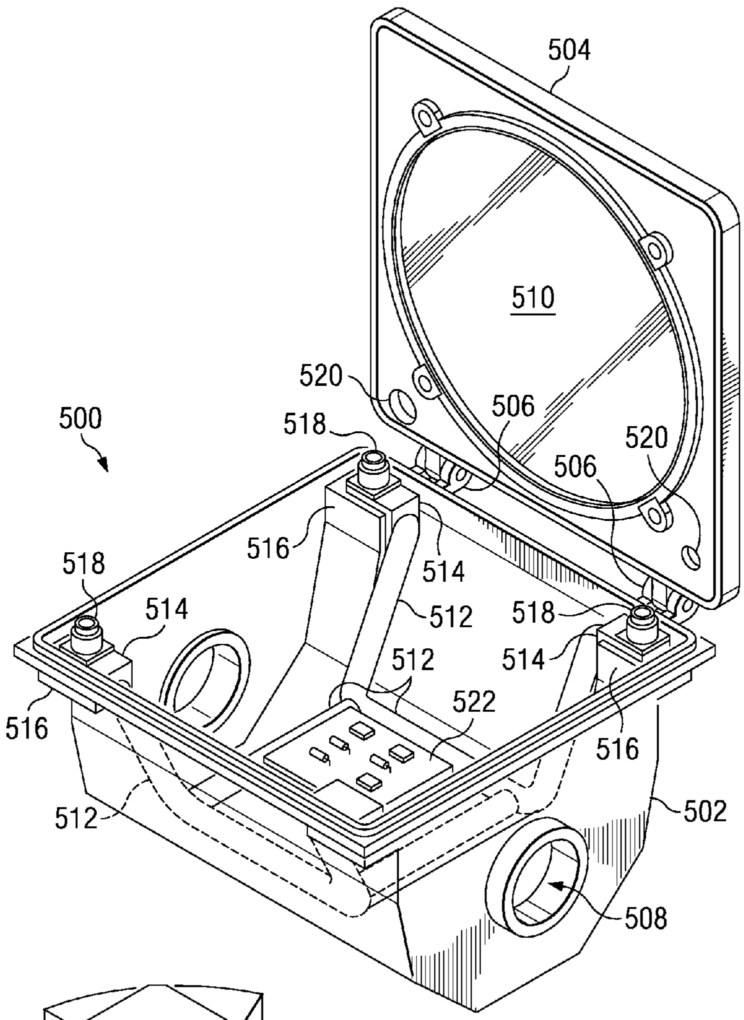
FIG. 5 shows the inside portion of the housing of the signal case shown in FIG. 2 in accordance with an illustrative embodiment of the present invention.

FIG. 5 shows the inside portion of the housing of the signal case shown in FIG. 2 in accordance with an illustrative embodiment of the present invention. As with signal case 200 shown in FIG. 2, signal case 500 includes housing 502, door 504, hinges 506, slot 508, and lens 510 arranged as described with respect to FIG. 1 and FIG. 2. In addition, frame 512 is shown inside housing 502. Portions of frame 512 are shown in phantom to show its position inside housing 502. Frame 512 rests inside housing 502, though frame 512 may be mounted or attached to housing 502 using any suitable method, such as screws, latches, or adhesives. In this illustrative example, frame 512 includes tabs 514 that rest against or are attached to mounts 516 provided within housing 502.

One or more sensors 518 are mounted on tabs 514. Each sensor in sensors 518 may be one of a variety of types of sensors and may operate as described with respect to FIG. 3 and FIG. 4. One or more apertures 520 may be provided to allow for the operation of sensors 518, as described with respect to FIG. 3 and FIG. 4. In addition, one or more control boards, such as control board 522, may be provided to control sensors 518. Control board 522 is attached to frame 512 via any suitable method, such as via welding, latches, screws, or an adhesive.

Frame 512 may be fashioned from a variety of materials, such as metal or plastic, and may be formed from a group of interconnecting rods or bars. Frame 512 is sized and dimensioned to accommodate the size and dimensions of a light source module attached to a door, such as light source module 306 in FIG. 3, and to accommodate the size and dimensions of the door and housing. Frame 512 may be attached directly to door 504 or may be attached to or otherwise disposed in housing 502.

In this illustrative example, frame 512 is adjustable and sized and dimensioned to fit snugly within housing 502. In these illustrative examples, frame 512 is flexible. Thus, frame 512 may be bent slightly, inserted into housing 502, and then allowed to rebound into its original shape such that frame 512 fits snugly inside housing 502. Hence, frame 512 allows sensors 518 and one or more control boards to be quickly and easily inserted into housing 502.

Figure 6:
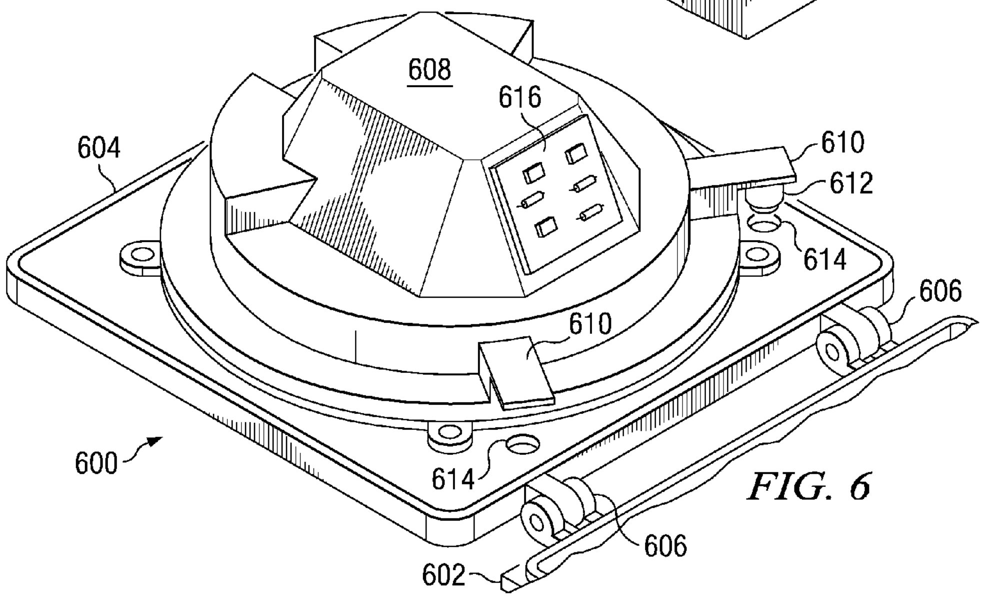
FIG. 6 shows the inside portion of the door of a signal case in accordance with an illustrative embodiment of the present invention.

FIG. 6 shows the inside portion of the door of a signal case in accordance with an illustrative embodiment of the present invention. As with the illustrative example shown in FIG. 3, signal case 600 includes housing 602, door 604 connected to housing 602 via hinges 606, and light source module 608.

As shown in this illustrative example, tabs 610 may be directly attached to or integrally formed with light source module 608. One or more sensors 612 may depend from tabs 610 opposite apertures 614. Control board 616 is directly attached to light source module 608, though control board 616 may be disposed within light source module 608 or on the opposite side of light source module 608. Sensors 612, control board 616, and apertures 614 operate in a manner similar to that described with respect to FIG. 3 and FIG. 4.

Figure 7:
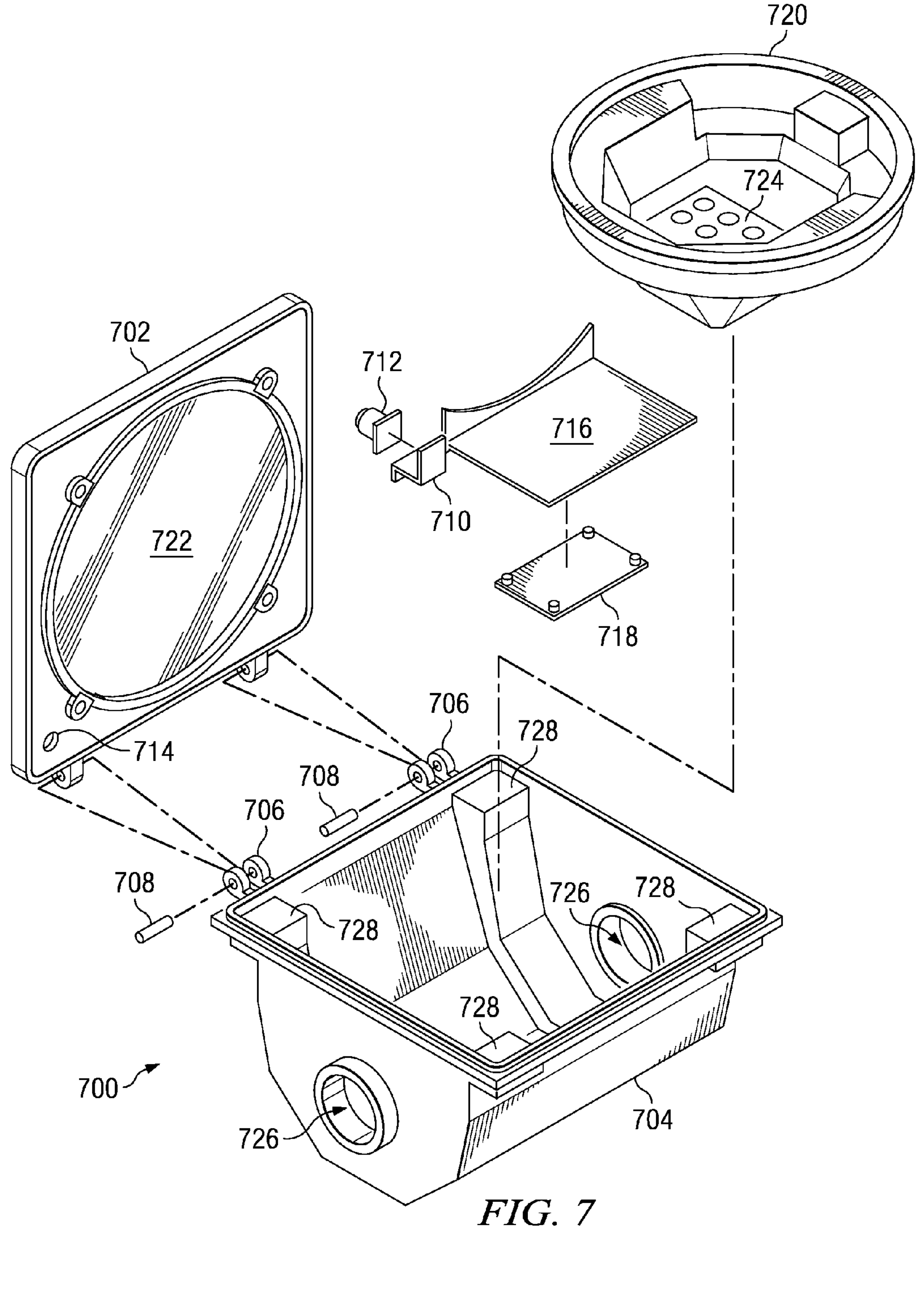
FIG. 7 shows an exploded view of a signal case in accordance with an illustrative embodiment of the present invention.

FIG. 7 shows an exploded view of a signal case in accordance with an illustrative example of the present invention. Signal case 700 includes door 702 attached to housing 704 via hinges 706 and hinge pins 708. Tab 710 is attached to door 702 and sensor 712 is attached to tab 710 opposite aperture 714 in door 702. Backboard 716 is attached to door 702 and control board 718 is attached to backboard 716.

In addition, light source module 720 is attached to lens 722 in door 702. When door 702 is shut, light source module 720 is disposed within housing 704. Light source module 720 includes light source 724, which, as shown, is a light emitting diode array. Of course, other types of light sources may be used in place of or in addition to light emitting diode array 724. Slot 726 is provided in housing 704 for use in connecting multiple signal cases together, as described in FIG. 1. Mounts 728 are provided in housing 704 to facilitate insertion of a frame, such as frame 512 in FIG. 5.

In use, signal case 700 is operated as a traffic light. Sensor 712 is used to sense some desired parameter while the traffic light is operating, or, if desired, when the traffic light is not operating. For example, sensor 712 may be a camera that takes pictures or video of object or events within the field of view of the camera.

Figure 8:
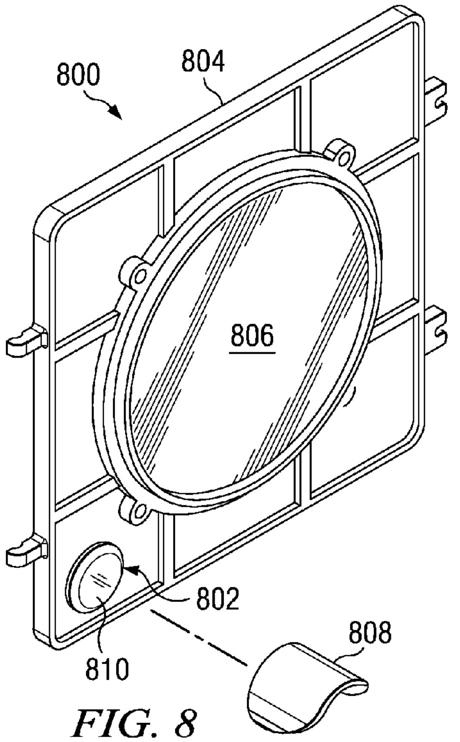
FIG. 8 shows the outside portion of the door of a signal case in accordance with an illustrative embodiment of the present invention.

FIG. 8 shows the outside portion of the door of a signal case in accordance with an illustrative embodiment of the present invention. Traffic signal 800 includes sensor 802 disposed within door 804. Traffic signal window 806 is disposed within door 804 to allow light to shine out of traffic signal 800.

As shown, sensor 802 is oriented outwardly from door 804 and is attached to the outside surface of door 804. Sensor 802 can be any sensor, as described above with respect to FIG. 4 through FIG. 7. Although sensor 802 is shown in the bottom left portion of door 804, sensor 802 can be disposed in or on any portion of door 804. Although not preferred in most applications, sensor 802 could be disposed within traffic signal window 806.

Sensor 802 can also be attached to any other portion of the traffic signal. For example, sensor 802 can be attached to a surface of the traffic signal on the portion of the housing that is opposite traffic signal window 806. Sensor 802 can be attached to or disposed through the top of the housing, the bottom of the housing, or one or more sides of the housing. Sensor 802 can be mounted at a variety of different angles with respect to the housing or the traffic signal. Multiple sensors can be disposed inside, on, or around the traffic signal. Thus, multiple sensors, such as sensor 802, can survey multiple parameters in multiple directions around the traffic signal. Thus, either door 804 or the housing of the traffic signal is configured such that the sensor can sense a parameter outside the housing. To protect the sensor, the sensor can be at least partially inside the housing.

Sensor 802 can be attached to door 804 or any other part of the housing of the traffic signal in a variety of ways. For example, sensor 802 can be provided with screw threads such that the sensor itself is screwed into door 804 or the housing of the traffic signal. Sensor 802 can also be directly mounted to door 804 or other portion of the housing of the traffic signal using screws, nails, glue, hook-and-loop fastener or any other suitable method. In this way, sensor 802 can be attached to any pre-existing traffic signal. As used herein, the term "pre-existing" means that the traffic signal or other object did not include sensor 802 when originally constructed or deployed. The term "pre-existing" also includes the specific example of a traffic signal or other object that was constructed without any intent to mount or deploy a sensor on or in the traffic signal or other object.

Sensor 802 can be provided with a power source, such as a rechargeable battery, a solar panel, or other power source to allow sensor 802 to operate independently. Sensor 802 can also be adapted to receive power from existing systems designed to power the traffic signal.

Attached to sensor 802 is optional cover 808. Optional cover 808 covers sensor 802 and protects sensor 802 from water, dust, flying debris, or other hazards. Also optionally, sensor 802 and cover 808 are of the same color as door 804 and of the housing of the traffic signal. In an illustrative example, the color is black, though any color or group of colors, such as camouflage, may be used. In this way, sensor 802 and cover 808 will be difficult to detect visually from a distance. Sensor 802 or cover 808 can also be provided with window 810 to further protect sensor 802. Window 810 is disposed in front of the sensor to protect the sensor. Together, window 810 and cover 808 thereby are disposed to protect window 810.

Although sensor 802 is shown as attached to a traffic signal, because sensor 802 can be attached to a pre-existing traffic signal sensor 802 can be attached to other objects. For example, sensor 802 can be attached to a public lamp. A public lamp is a light source attached to an object such that the light source can illuminate a public area. A public area is any area designated for public use, such as a street, road, walkway, parking lot, or other public area. The object can be any suitable object. In the case of a street or road the object is usually a pole. Together, the pole and public lamp are commonly referred to as street lights or street lamps. However, the term public lamp is not limited to street lights. For example, the term public lamp, as defined above, also includes traffic signals. The public lamp to which sensor 802 is attached can be a pre-existing public lamp. The public lamp to which sensor 802 is attached can also be specifically modified to allow sensor 802 to be easily mounted to the public lamp.

Attaching sensor 802 to a public lamp, particularly a public lamp near a traffic intersection, as a number of advantages. Public lamps are generally taller than traffic signals. Thus, a camera or other sensor 802 located on or near the top of a public lamp has a wider or longer field of view down roads leading to the traffic intersection. Additionally, mounting a camera or other sensor 802 to a public lamp will provide lighting for viewing an area to be surveyed by the camera or other sensor 802. Either or both of these advantages provide for the ability to perform "advanced detection," which is tracking vehicles far down roads leading to an intersection in order to take actions described above—such as changing the timing of traffic signals or turning a public lamp on or off.

Additionally, another action that can be taken is to implement a technique that can be referred to as "red light holding."

In the red light holding technique, the velocity and distance of vehicles approaching an intersection is monitored as a light changes to red. Normally, when a traffic signal light turns red, all the lights in the intersection for red for a short time, usually between about 1 to 2 seconds. In red light holding, this short time can be extended to 3 seconds or more if vehicles moving at beyond a predetermined speed are predicted to enter an intersection in violation of a red light. Red light holding "holds" the red light at all directions of an intersection. Because no one else enters the intersection when all lights are read, an accident can be prevented.

In another example, sensor 802 can be attached or mounted to a wall, door, building, awning, or any other object that has a view of a public area. Sensor 802 can also be used to sense parameters within private areas, though permission from the private owner should be obtained in this case.

As described above, sensor 802 can be used to sense a parameter, where the parameter could be a great many physical properties of interest. An action can be taken in response to detecting a parameter. Usually, the action is implemented by a processor, such as processor 1000 shown in FIG. 10, though the action could be implemented by some other circuit or manually by a user.

For example, sensor 802 can be a camera used to detect visibility. If visibility falls below a pre-defined threshold, such as in the case that a fog arises in the vicinity of sensor 802, then a processor or circuit to which sensor 802 is attached takes an action. In this case, exemplary actions include increasing the brightness of the traffic signal, changing the intensity or color of a public lamp or some other light, causing the traffic lights to flash, extending the length of a color of a traffic light (red, yellow, or green), transmitting an alert to a control center, or taking some other action. As used herein a control center can be any type of human or computer-controlled system for controlling traffic signals, controlling other objects or systems, or monitoring data from one or more sensors. Examples of control centers include emergency 911 dispatchers, traffic control centers maintained by public transportation departments, military command outposts, disaster relief or control centers, data collection center, any centralized command and control facility, server farms, or any other suitable area for receiving data from one or more sensors. The action taken by the processor upon detecting this parameter can be one of these actions or a combination of these actions.

In another example, sensor 802 can be a microphone used to detect sound waves. If sound waves characteristic of an explosion, accident, gun shot, or other potentially urgent situation are detected, then a processor or circuit to which sensor 802 is attached takes an action. Exemplary actions include alerting a 911 dispatcher or alerting a traffic control operation center to prompt a human to directly monitor the output of sensor 802. If multiple sensors are used around an intersection or in various locations throughout an area, then the location of the gunshot, accident, explosion, or other incident can be determined via triangulation and/or by correlating the intensity of sound waves at different locations. The action taken by the processor upon detecting this parameter can be one of these actions or a combination of these actions.

In another example, sensor 802 can be a camera that is disposed to monitor traffic approaching an intersection. As vehicles approach, a processor uses output from sensor 802 to determine the speed of vehicles approaching an intersection and/or the distance of vehicles approaching an intersection. The processor can then, by executing computer-usable program code, determine whether the length of a yellow light is appropriate for a given "dilemma zone." A dilemma zone is an area extending from an intersection along a street or road in which drivers traveling at about the speed limit must make a split-second decision whether to stop for a yellow light or to continue through the intersection. The time to make this decision can be estimated. This time is multiplied by chosen speed, usually the speed limit, to calculate the length of the dilemma zone.

Because the dilemma zone depends on the speed of the vehicles approaching the intersection, sensor 802 can be used to take action in case the overall average speed of vehicles change within a pre-determined time period. For example, if the sensor or sensors sense an overall average speed of vehicles increases within a pre-determined time period, then the processor takes an action to increase the length of time a yellow light is activated or to change the duration of a red or green light. The length of time a yellow light or other light is on can be similarly shortened if the overall average speed of vehicles changes within a particular time. Additionally, the processor can cause an alert to be transmitted to a control center so that a human or a computer program can monitor the situation. The action taken by the processor upon detecting this parameter can be one of these actions or a combination of these actions.

Additionally, the dilemma zone depends on the ability of vehicles approaching the intersection to stop. Thus, for example, if sensor 802 or some other sensor sense rain, ice, or other dangerous conditions on the road, then the processor can take action to cause the traffic light to display yellow for a longer period of time.

In other examples, sensor 802 or one or more additional sensors can detect additional parameters and take correspondingly appropriate actions. For example, if one or more sensors detect radiation, such as beta radiation, alpha radiation, or high energy photons, over a pre-determined amount of background radiation, then the processor can take an action to alert a control center, notify police or other emergency personnel, sound an audible or visible alarm in the vicinity of the sensor, or take some other action. If one or more sensors detect biological hazards, such as bacteriological like anthrax or viral agents like smallpox, then similar action can be taken. If one or more sensors detect chemical hazards, such as toxins like predetermined high levels of gasoline or chemical weapons like sarin, soman, or VX, then similar action can be taken. The action taken by the processor upon detecting this parameter can be one of these actions or a combination of these actions.

The examples of uses for sensor 802 given above are not exhaustive. Many other uses for sensor 802 exist, such as traffic law enforcement, criminal investigation, traffic flow control, and others. For example, if sensor 802 detects a vehicle violating a red light or detects excessive speed in a vehicle, then the processor can take action to, using known methods, cause a traffic citation to be automatically generated and mailed to the owner of the offending vehicle. In another example, if sensor 802 detects more than a predetermined number of cars at a particular portion of an intersection, then the processor can take action to lengthen or shorten the duration of green or red lights facing particular directions to change dynamically how a group of traffic signals operate at an intersection.

Figure 9:
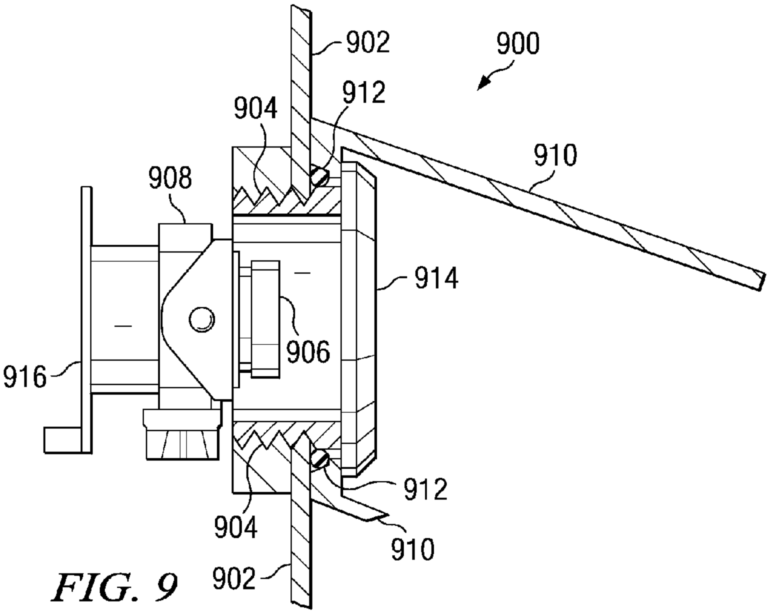
FIG. 9 shows a sensor attached to a gimbal in accordance with an illustrative embodiment of the present invention.

FIG. 9 shows a sensor attached to a gimbal in accordance with an illustrative embodiment of the present invention. Sensor 900 is attached to door or housing 902 in the exemplary embodiment of FIG. 9 via screw threads 904. Sensor 900 can be any of the sensors described with respect to FIG. 3 through FIG. 8 and can be operated to perform any of the functions described vis-à-vis those figures.

In the example shown in FIG. 9, sensor 900 includes camera 906. Camera 906 is attached to gimbal 908. A gimbal is a mechanical device that allows the rotation of an object in two or three dimensions. A gimbal includes two or three pairs of pivots, mounted on axes at right angles. A three-axis gimbal may allow an object mounted on it to remain in a horizontal plane regardless of the motion of its support. In the example shown in FIG. 9, gimbal 908 is a three-axis gimbal, though gimbal 908 can be any type of gimbal. Thus, sensor 900 can turn or rotate as desired or needed to monitor different areas of an intersection. Additionally, when sensor 900 is a camera, gimbal 908 allows sensor 900 to view further down a road leading to an intersection. In other illustrative examples, sensor 900 can be provided with multiple gimbals of different sensitivity to modify how sensor 900 is rotated or moved.

Other portions of sensor 900 are shown in FIG. 9 for reference. For example, cover 910 is shown extending from the outside of door or housing 902. O-ring 912 seals the area inside door or housing 902 from the external environment, thereby protecting any electronics or components inside door or housing 902. Window 914 can be disposed outside door or housing 902 to further protect camera 906. Window 914 corresponds to window 810 in FIG. 8. Additionally, mount 916 may optionally be provided.

Figure 10:
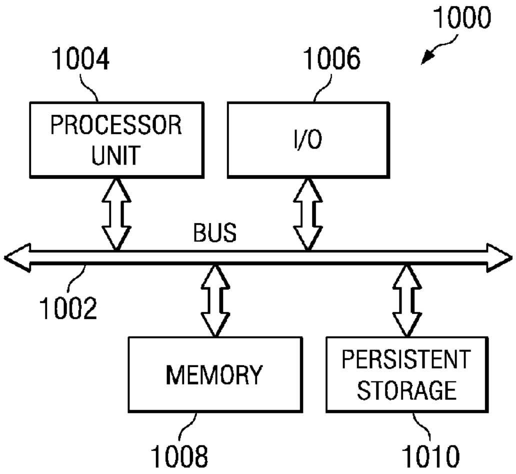
FIG. 10 is a block diagram of a processing unit in accordance with an illustrative embodiment of the present invention.

FIG. 10 is a block diagram of a processing unit in accordance with an illustrative embodiment of the present invention. Processing unit 1000 may be any suitable data processing system, such as a personal computer, personal digital assistant, a mobile computer, a stand-alone processing unit, or any suitable processor or data processing system for operating computer-usable code in a recordable-type medium. Processing unit 1000 can be an existing processor used to control a traffic signal, or can be an additional processor used to control a sensor attached to a traffic light or a public lamp. Processing unit 1000 could also be in electrical communication with a sensor attached to a traffic light or a public lamp. In any case, processing unit 1000 can execute computer-usable code to perform an action in response to the sensor sensing a parameter, as described elsewhere herein. The action can be any number of actions and the parameter can be any number of parameters, as described above with respect to FIG. 8 or elsewhere herein.

Processing unit 1000 includes bus 1002 which allows various other components of processing unit 1000 to communicate with each other. In particular, bus 1002 is in communication with processor 1004, which executes computer usable program code for producing a slice or a model of an object. An example of a processor is an Intel Pentium IV® processor, though many different processors may be used.

Bus 1002 is also in communication with input/output device 1006. Input/output device 1006 allows processing unit 1000 to communicate with various external devices, such as a control center, as described in FIG. 8. Examples of input/output devices include an Ethernet port and a wireless communication device, though many different input/output devices may be used.

Bus 1002 is also in communication with memory 1008. Memory 1008 includes computer usable program code for performing an action in response to the sensor sensing a parameter. Bus 1002 is also in communication with persistent storage 1010. Persistent storage 1010 can also contain computer usable program code as described above. Persistent storage 1010 can also contain data collected by a sensor.

Figure 11:
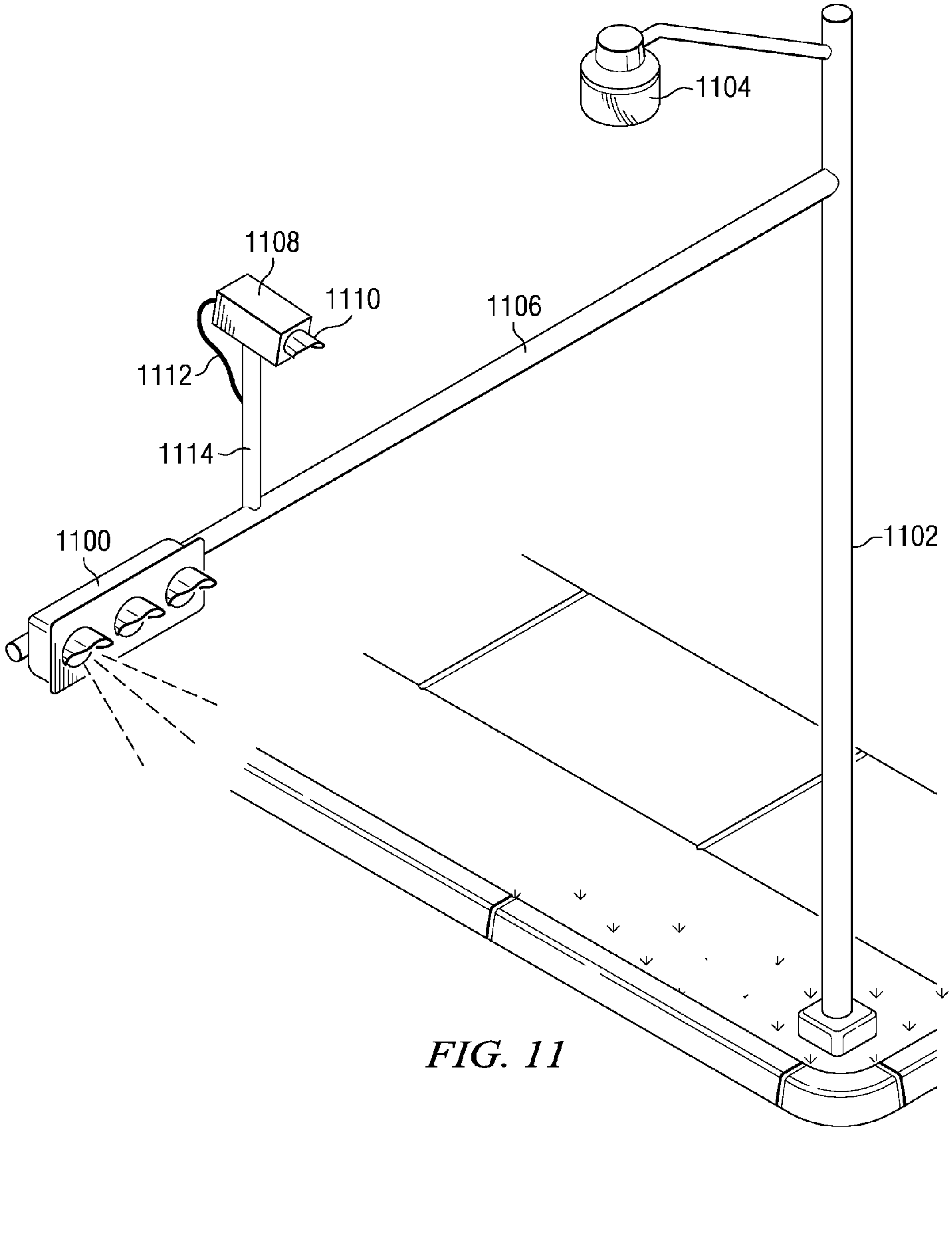
FIG. 11 shows a traffic light in which illustrative embodiments may be implemented.

FIG. 11 shows a traffic light in which illustrative embodiments may be implemented. FIG. 11 shows a traffic control assembly including traffic light 1100 mounted to light post 1102, to which is also mounted street light 1104. Traffic light 1100 can be an existing traffic light or could be a set of traffic lights, such as those shown in FIG. 1. Also attached to light post 1102 is cross beam 1106. Cross beam 1106 supports traffic light 1100. Also attached to cross beam 1106 is traffic camera 1108. Traffic camera 1108 represents a prior art traffic camera and a prior art system for monitoring traffic in the intersection which the traffic assembly controls. Traffic camera 1108 includes visor 1110 and cable 1112.

Traffic camera 1108 can be found throughout the United States. These cameras are typically used to monitor traffic patterns and to adjust the signal pattern displayed by traffic light 1100 according to detected traffic patterns. Traffic camera 1108 can also be used to monitor vehicle speed or to monitor for possible illegal behavior.

Traffic camera 1108 is plagued with a variety of problems. One of the problems of foremost concern is an issue of dirty lens covers. Even though traffic camera 1108 is provided with visor 1110, the lens or lens cap inside the visor often becomes covered with dirt, water condensation, or other debris. The only known method to clean the traffic camera lens is to send a work crew with a bucket truck to the intersection, cone off the lane over which the traffic camera 1108 sits, and manually clean the lens. For an intersection that typically contains between four and six cameras, the time required to perform this task can be from about one to about three hours. This task is labor intensive and expensive.

An additional problem encountered by traffic camera 1108 is that traffic camera 1108 has a high-profile, not only due to the actual camera box of traffic camera 1108, but also due to support pole 1114. As a result, high winds can damage traffic camera 1108, knock traffic camera 1108 out of alignment, and/or reduce the overall life expectancy of traffic camera 1108. As a result, relatively frequent maintenance is required, particularly after a major storm. For example, in cities that are regularly hit by hurricanes, most of the traffic cameras such as those shown in FIG. 11 have to be realigned, cleaned, and/or replaced.

The third problem encountered by traffic camera 1108 is that data and power cable 1112 is exposed to the elements. This exposure further reduces the expected lifetime of traffic camera 1108 and increases the amount of maintenance required by traffic camera 1108. Additionally, the cable connector itself is usually exposed to the elements, leading to corrosion and malfunction. Furthermore, because the connection is outside the camera housing, strain on the connector from the weight of the cable can further increase the maintenance cycle of traffic camera 1108.

In addition, the power supply for traffic camera 1108 is contained within the housing of traffic camera 1108. As a result, the temperature within traffic camera 1108 can become very high, particularly during summer months. Temperatures as high as 175° Fahrenheit have been measured inside the housings of existing traffic cameras, such as traffic camera 1108.

Figure 12:
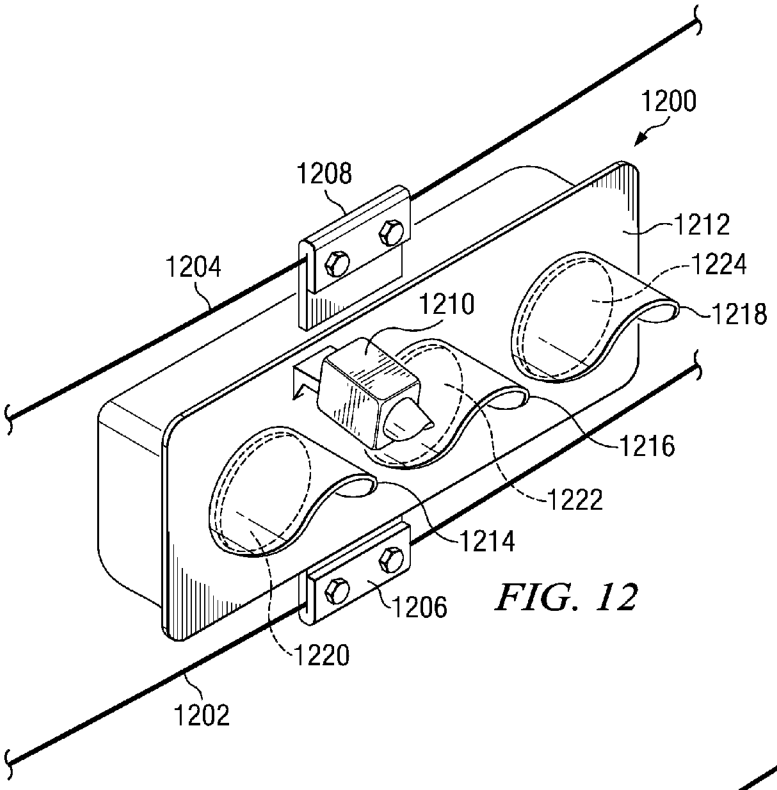
FIG. 12 shows a traffic signal clamped between two span wires wherein the traffic signal has a camera attached thereto, in accordance with an illustrative embodiment.

FIG. 12 shows a traffic signal clamped between two span wires, wherein the traffic signal has a camera attached thereto, in accordance with an illustrative embodiment. FIG. 12 shows traffic light 1200 attached to two spanning wires, including spanning wire 1202 and spanning wire 1204. Traffic light 1200 is attached to spanning wire 1202 via clamp 1206 and traffic light 1200 is attached to spanning wire 1204 via clamp 1208.

In an illustrative embodiment, camera 1210 is attached to back plate 1212 of traffic light 1200. Camera 1210 is relatively small, weighing less than half a pound, though within the range of one pound to less than a few ounces. This weight includes the weight of the camera, the weight of the camera housing, and the weight of the camera visor. Prior art traffic cameras, such as traffic camera 1108 in traffic light 1100 weigh upwards of ten to twenty pounds, or more, not including the weight of the mounting pole used to mount the prior art traffic camera to a cross beam. The low mass of camera 1210, combined with the fact that camera 1210 has a low-profile, means that high winds are less likely to knock camera 1210 out of alignment.

Camera 1210 can be disposed on areas other than back plate 1212. For example, camera 1210 can be mounted on the visors of the actual traffic signals, such as visors 1214, 1216, and/or 1218, on the crossbeam, on the traffic light pole, on spanning wires, or in any location from which an intersection can be observed. Visors 1214, 1216, and 1218 are also mounted to back plate 1212. In most traffic signals, back plate 1212 provides a background that provides a contrast to more easily see lights 1220, 1222, and 1224. Back plate 1212 is typically about six inches wide. Back plate 1212 is itself typically mounted to the back of the traffic signal housing and not to a front cover.

Camera 1210 is provided with a variety of features that solve many of the problems associated with prior art traffic cameras, such as traffic camera 1108 of FIG. 11. These features include use of lenses and lens covers of low specific heat material, an angled visor, relatively small optical aperture diameter, low power consumption, a non-metallic housing, a silicon dioxide coating on a lens cap, and other features. The features of the design of camera 1210 are described further with respect to FIGS. 14 through 18.

Figure 13:
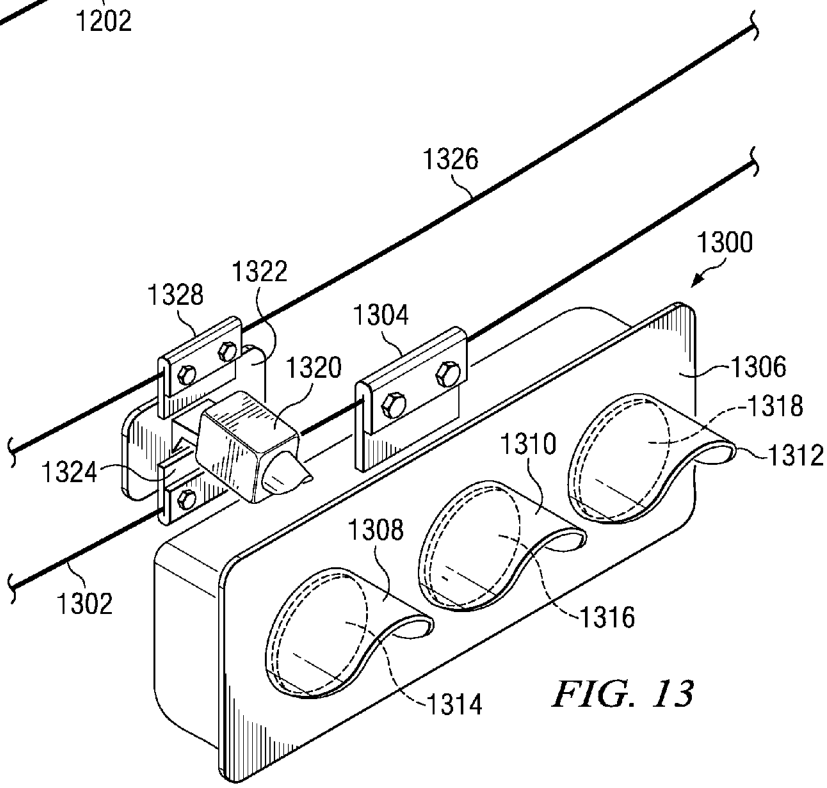
FIG. 13 shows a traffic signal clamped to a single span wire and a camera clamped between two span wires, in accordance with an illustrative embodiment.

FIG. 13 shows a traffic signal clamped to a single span wire and a camera clamped between two span wires, in accordance with an illustrative embodiment. Traffic signal 1300 is similar to traffic light 1200 shown in FIG. 12 and could be traffic signal 100 shown in FIG. 1. In the illustrative embodiment shown in FIG. 13, traffic signal 1300 is suspended from a single span wire 1302.

Traffic signal 1300 is attached to single span wire 1302 via clamp 1304. Traffic signal 1300 includes back plate 1306, light visors 1308, 1310, and 1312, and corresponding lights 1314, 1316, and 1318. Unlike traffic light 1200 in FIG. 12, traffic signal 1300 swings from single span wire 1302 in a windy environment. Because a traffic camera should not substantially change angle in a windy environment, traffic camera 1320 is ideally not placed on traffic signal 1300. Instead, traffic camera 1320 is mounted onto a separate, small back plate 1322. In turn, small back plate 1322 is mounted to single span wire 1302 via clamp 1324 and to a second span wire 1326 via clamp 1328. If second span wire 1326 is not already available, then second span wire 1326 can be strung between the two supports used to support single span wire 1302. In this way, the direction in which traffic camera 1320 points is not substantially altered by a significant amount in a windy environment. Traffic camera 1320 has a variety of properties, such as those described with respect to FIG. 12 and more particularly, as described with respect to FIGS. 14 through 18.

Figure 14:
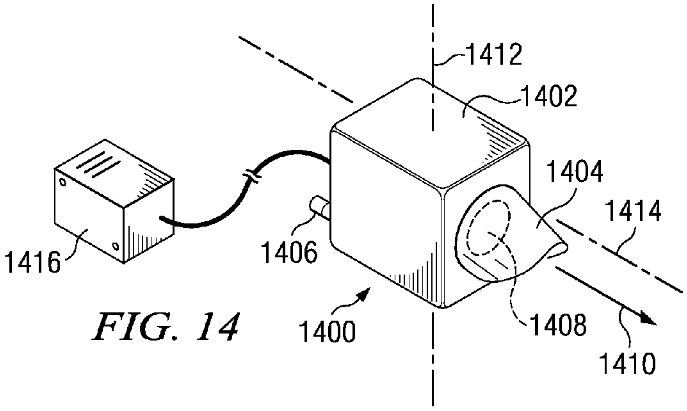
FIG. 14 shows a camera case and visor, in accordance with an illustrative embodiment.

FIG. 14 shows a camera case and visor, in accordance with an illustrative embodiment. Traffic camera 1400 can be any of traffic cameras 1320 in FIG. 13 or camera 1210 of FIG. 12, or can replace camera 802 in FIG. 8.

Traffic camera 1400 includes camera housing 1402 and visor 1404. Additionally, a BNC (Bayonet Neill Concelman) coax connector 1406 extends from camera housing 1402. The solid state and electronics to operate traffic camera 1400 are operably disposed within camera housing 1402. The term "operably disposed" means that the camera is within housing 1402 and is capable of operating as a camera within housing 1402. The camera lens is disposed within camera housing 1402 as shown by phantom line 1408. Thus, the camera lens points out of visor 1404 as shown by arrows 1410. Other views and features of traffic camera 1400 are shown with respect to FIGS. 15 through 18.

In the illustrative embodiment shown in FIG. 14, visor 1404 is angled downwardly with respect to axis 1412 and axis 1414. Thus, when traffic camera 1400 is mounted to a back plate visor door or other portion of a traffic signal, lens 1408 is provided with greater physical protection from dust, water, snow, ice and other contaminates.

In an illustrative embodiment, power supply 1416 for traffic camera 1400 is provided in a physically separate housing. In this way, the temperature inside camera housing 1402 can be lower than temperatures that arise within the housings of traditional traffic cameras that also include a power supply.

For example, traffic camera 1400 and a traditional traffic camera were placed side-by-side on the same traffic signal of a particular intersection. During the heat of the summer day, the temperature inside the housing of the traditional traffic camera was at about 175° Fahrenheit. However, at the same time, the temperature measurement inside camera housing 1402 was only about 125° Fahrenheit. This 50° temperature differential increases the longevity of the sensitive electronics that make up the camera inside camera housing 1402. This temperature differential is achieved because, among other reasons, power supply 1416 is not inside camera housing 1402. The temperature within camera housing 1402 can be further moderated by placing traffic camera 1400 in the lee or shadow of the traffic signal to which traffic camera 1400 is mounted. This option is not available using traditional traffic cameras because traditional traffic cameras are very large compared to traffic camera 1400 and are mounted on exposed poles. An additional technique for keeping the camera cool is to provide holes in camera housing 1402 through which air can circulate.

In an illustrative embodiment, camera housing 1402 is fitted with sliders which can be made of aluminum, polycarbonate materials, Plexiglas, or other materials which are adapted to mount traffic camera 1400 on existing traffic signals. In illustrative embodiment, camera housing 1402 can be mounted on a traffic camera pole, such as pole 1114 in FIG. 11. Power supply 1416, or a power regulator, can also be mounted on a traffic camera pole, such as pole 1114 in FIG. 11, or a cross beam or other support, such as cross beam 1106, though power supply 1416 is physically separate from camera housing 1402. The low weight of camera 1400 reduces the moment of inertia and the profile of the camera, thereby reducing the possibility of knocking camera 1400 out of alignment during winds. Thus, no drilling or other time consuming activities are required to mount traffic camera 1400 to any portion of a traffic signal. Note that traffic camera 1400 can be mounted to a visor of a traffic signal, to a back plate of a traffic signal, to a housing of a traffic signal, to one or more span wires to which a traffic signal is attached, to a door of a traffic signal, to the back of the traffic signal, or to a cross beam or supporting traffic signal pole. Traffic camera 1400 can also be mounted to other portions of a traffic signal system.

In an illustrative embodiment, BNC coax connector 1406 is mounted inside camera housing 1402. BNC coax connector 1406 connects the electronics of traffic camera 1400 to external computers and possibly to power. In traditional traffic cameras, such as traffic camera 1108 in FIG. 11, BNC coax connector 1406 is placed outside of camera housing 1402. As a result, extra strain is placed on the connectors and, additionally, the connectors are exposed to the elements in traditional traffic cameras. For this reason, traditional traffic cameras are subject to more frequent failure. However, by placing BNC coax connector 1406 and power supply 1416 inside camera housing 1402, such strain can be relieved and BNC coax connector 1406 can be protected from the elements.

In another illustrative embodiment, traffic camera 1400 uses a relatively low amount of power. In an illustrative embodiment, the power required for traffic camera 1400 is about 12 volts direct current. Traditional traffic cameras operate at about 120 volts alternating current. This high voltage alternating current can create positive ions which attract dust. The same effect can be seen on most television screens present in the average American home. By using direct current voltage, this attraction of dust can be avoided. Additionally, because the power is lower, the temperature generated inside camera housing 1402 can be further reduced. The temperature can be further reduced by not completely sealing camera housing 1402. Thus, some air flow can be present inside camera housing 1402 to further decrease the temperature inside camera housing 1402.

In another illustrative embodiment, a gimbal assembly can be provided inside camera housing 1402. Camera housing 1402 protects the gimbal assembly from wind. The gimbal assembly allows the camera to point in slightly different directions. Thus, traffic camera 1400 does not necessarily have to point in exactly the same direction all the time.

Figure 15:
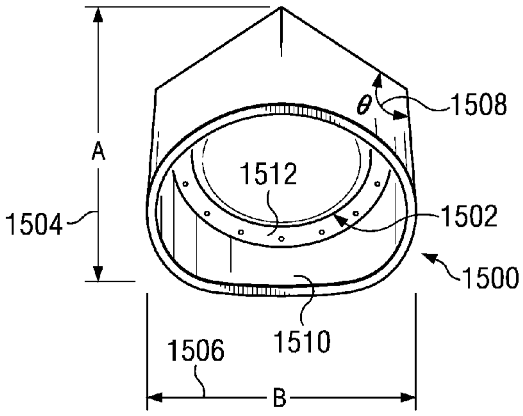
FIG. 15 shows a view of a camera visor, in accordance with an illustrative embodiment.

FIG. 15 shows a view of a camera visor, in accordance with an illustrative embodiment. FIG. 15 shows a front view of traffic camera 1400 shown in FIG. 14, traffic camera 1320 in traffic camera 1320, or camera 1210 in FIG. 12.

In particular, FIG. 15 shows some of the dimensions of visor 1404 in FIG. 14. Thus, visor 1500 corresponds to visor 1404 of FIG. 14. The relative scale of visor 1500 and lens cap 1502 is shown by arrows A 1504 and arrows B 1506. In an illustrative embodiment, arrows A 1504 represent a distance of about 1.8 inches. The distance of arrows B 1506 in an illustrative embodiment represents a distance of about 1.7 inches. As shown by angle θ 1508, a portion of visor 1500 is inclined downwardly to cover the top portion of lens cap 1502. The angled portion of visor 1500 can be referred to as the ceiling of visor 1500. In addition, a portion of visor 1500 shown in the general area of area 1510 extends outwardly from lens cap 1502 and/or the housing. The portion of visor 1500 in the general area of area 1510 can be referred to as the floor of the visor. Area 1510 provides additional protection to lens cap 1502. The floor 1510 can be considered connected to the ceiling of visor 1500 via side walls. Note that the term "connected" is used for reference only; in an illustrative embodiment, the floor, walls, and ceiling are integrally formed together.

In an illustrative embodiment, negative ion generator 1512 is disposed around lens cap 1502. Although negative ion generator 1512 is shown inside visor 1500, negative ion generator 1512 can be disposed outside of visor 1500 or on the housing of the traffic camera, such as camera housing 1402 shown in FIG. 14. Additionally, negative ion generator 1512 can be placed on or in the signal itself rather than on or around visor 1500, so long as negative ion generator 1512 is near enough to visor 1500 and lens cap 1502 to be effective at helping lens cap 1502 to remain clean. When near enough to have operable effect in the vicinity of lens cap 1502, negative ion generator 1512 is said to be adjacent to lens cap 1502.

Negative ion generator 1512 causes electrons to be added to molecules of oxygen and other trace gases in the area surrounding lens cap 1502. This process creates negative ions. When ions collide with airborne contaminates, such as dust, mold, pollen, bacteria, ice, and other particles, a negative charge is transferred to the airborne particle. However, surrounding this newly negatively charged particle are many other particles that are positively charged. These positively charged particles are drawn to the negatively charged particle and begin to clump together. Eventually, these particles become too heavy to stay in the air and fall harmlessly to the ground. As a result, dust and other contaminates form or fall on lens cap 1502 with far less frequency than had negative ion generator 1512 not been present.

Additionally, lens cap 1502 is made from a low specific heat material that repels water condensation. In an illustrative embodiment, lens cap 1502 and the lens behind lens cap 1502 can be made from a polycarbonate material, such as MAKRALON of grade AL2647. Such a material is available from Bayer Material Science, LLC. In addition to repelling water condensation, this material is scratch resistant, which further improves the transparency of lens cap 1502. In an illustrative embodiment, a silicon dioxide coating can be added to lens cap 1502 to further repel build up of dirt, dust, and other contaminates.

Taken together, all of these features provide an unexpected result of low maintenance for cameras made according to the design shown in FIGS. 14 and 15. In an illustrative embodiment, cameras deployed in the real world have remained clean and maintenance free for a little less than a year. Maintenance of traffic camera 1400 is at least four times less frequent than prior art traffic camera 1108 of FIG. 11. This result is surprising to those of skill in the art. Traditional traffic cameras, particularly in areas subject to contamination such as ocean fronts or dusty areas may need to be cleaned or maintenanced every few months, resulting in substantially increased costs. Thus, the illustrative embodiments described herein provide a quantum leap in the art of cameras for monitoring traffic.

Figure 16:
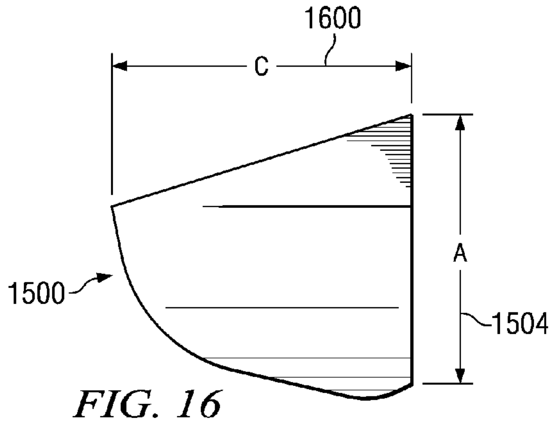
FIG. 16 shows a view of a camera visor, in accordance with an illustrative embodiment.

FIG. 16 shows a view of a visor for a camera in accordance with an illustrative embodiment. FIG. 16 illustrates another view of traffic camera 1400 of FIG. 14, and of visor 1500 shown in FIG. 15. Visor 1500 of FIG. 16 is shown as having side dimensions of proportions shown by arrows C 1600 and arrows A 1504. Arrows A 1504 correspond to arrows A 1504 in FIG. 15. As with the illustrative embodiment shown in FIG. 15, one dimension for arrows A 1504 could be 1.8 inches, although this value may vary. In the same illustrative embodiment, an exemplary value for arrows C 1600 is 2.1 inches.

Figure 17:
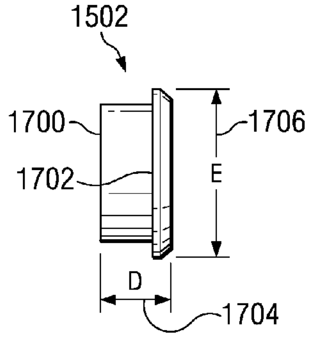
FIG. 17 shows a lens cap for a camera, in accordance with an illustrative embodiment.

FIG. 17 shows a lens cap for a camera, in accordance with an illustrative embodiment. Lens cap 1502 in FIG. 17 corresponds to lens cap 1502 shown in FIG. 15. Lens cap 1502 includes cylinder 1700 and lens cap head 1702. Lens cap head 1702 seals lens cap 1502 within visor 1500 of FIG. 15. In an illustrative embodiment, the size of lens cap 1502 is shown by arrows D 1704 and arrows E 1706. In a particular illustrative embodiment, arrows D 1704 can be 0.7 inches and arrows E 1706 can be 1.5 inches. The characteristics of lens cap 1502 are described with respect to FIG. 15.

Figure 18:
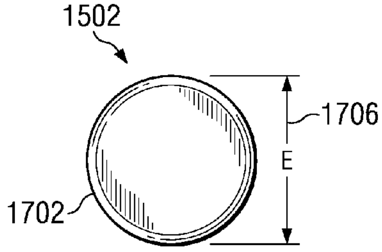
FIG. 18 shows a lens cap for a camera, in accordance with an illustrative embodiment.

FIG. 18 shows a lens cap for a camera, in accordance with an illustrative embodiment. FIG. 18 shows a front view of lens cap 1502 which corresponds to lens cap 1502 of FIG. 15 and lens cap 1502 of FIG. 17. As described above, arrows E 1706 represent a diameter of lens cap head 1702. As described above, an illustrative value for the distance represented by arrows E 1706 can be 1.5 inches. The physical characteristics of lens cap 1502 are described with respect to FIG. 15.

Figure 19:
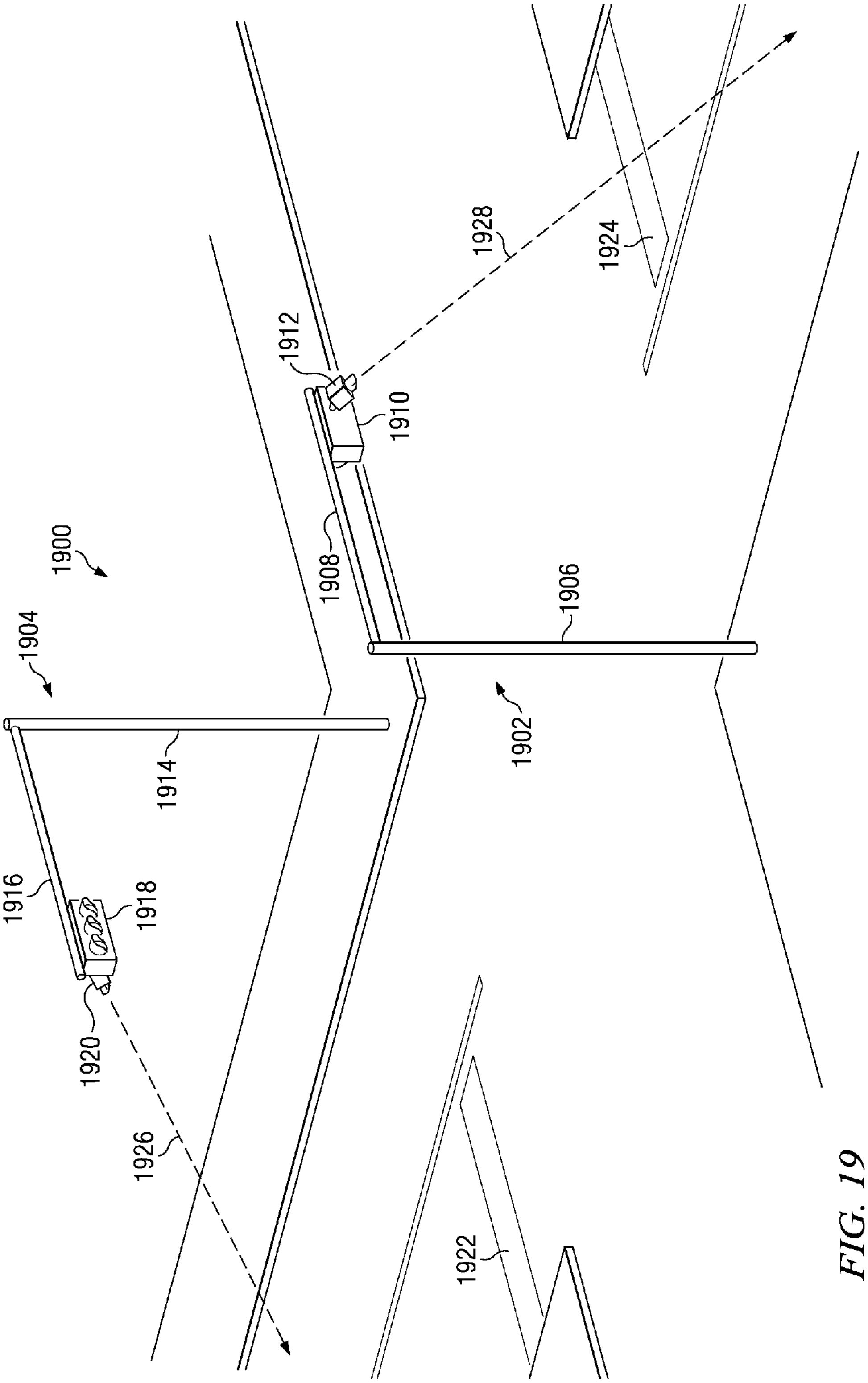
FIG. 19 shows an intersection and placement of cameras for advanced vehicle detection, in accordance with an illustrative embodiment.

FIG. 19 shows an intersection and placement of cameras for advanced vehicle detection, in accordance with an illustrative embodiment. FIG. 19 shows an exemplary intersection 1900 which has two traffic signal systems 1902 and 1904. Traffic assembly 1902 includes mounting pole 1906, cross beam 1908, traffic signal 1910, and traffic camera 1912. Similarly, traffic assembly 1904 includes mounting pole 1914, cross beam 1916, traffic signal 1918, and traffic camera 1920. The illustrative configuration of traffic cameras shown in FIG. 19 can be used to perform advanced detection and vehicle counts.

In modern traffic control systems, video cameras are used to see beyond the stop bar of an intersection, such as, for example, stop bars 1922 and 1924. By analyzing the number of cars lined up behind stop bars 1922 and 1924, a traffic controller or an automatic traffic control system can determine whether and how to alter the pattern of operation of traffic signals 1910 and 1918. Additionally, by viewing approaching cars several hundred feet away from stop bars 1922 and 1924, traffic cameras 1912 and 1920 can be used to determine how long a time is needed for a light to be yellow in order for approaching cars to safely stop behind traffic bars 1922 and 1924.

One problem associated with performing this type of advanced detection system is how to obtain a good view with a camera. Ideally, the camera should be at a forty-five degree angle and be positioned directly above the road. In this case, the pole would be about 200 to 300 feet high to see a similar distance down the road. This solution is often not practical. One way to solve this problem is to move the camera closer towards the direction of approaching traffic. Thus, for example, traffic approaching from the left hand side of FIG. 19 is detected using traffic camera 1920. For this reason, traffic camera 1920 is pointed in roughly the direction shown by arrows 1926. In other illustrative embodiments, the angle formed by arrows 1926 and a line parallel to the road is not as steep as the one shown. Similarly, traffic camera 1912 is pointed in the direction of arrows 1928. By mounting the cameras 1912 and 1920 on the backside of traffic signals 1918 and 1910, the camera can be placed 50 to 125 feet closer than would otherwise be possible. This orientation allows for better detection while still taking advantage of existing sensor platforms.

Another advantage to orienting traffic cameras 1912 and 1920 on the back side of traffic signals 1910 and 1918 is that during vehicle counting, a more accurate count can be made. Counting cars as they approach is more difficult than counting cars as they leave. Thus, by placing cameras behind traffic signals, cars can be counted as they pass underneath the corresponding traffic signal 1910 and 1918.

An additional advantage to the orientation of traffic cameras 1912 and 1920 is that the cameras do not have to be mounted on separate poles which may result in occlusion of the cameras from other obstructing objects, such as, for example, buildings, billboards, trees, or other obstructions. Another typical occlusion is a large truck blocking view of a small car. Furthermore, cameras 1912 and 1920 can be integrated with existing electronics and wiring systems as opposed to having to provide such systems on separate mounting poles.

The aspects of the present invention have several advantages over currently available traffic signals. For example, by including sensors within the signal case itself, the sensor is protected from the elements and from vandals. Particularly, the illustrative embodiments described with respect to FIG. 11 through FIG. 19 are resistant to moisture, dirt, pollen, and other contaminants. In addition, the chance of a person noticing the sensors is reduced. For this reason, the sensor or sensors are more likely to capture criminal activity. By attaching the sensors to a frame, the sensors may be added quickly and cost effectively to existing signal cases or other types of traffic signals.

The description of the different aspects of the present invention have been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A traffic monitoring device comprising:

a camera operably disposed within a housing, wherein the housing is attached to an object such that the camera can observe traffic flowing past a traffic signal;

a visor attached to the housing, wherein the visor comprises a first section and a second section, wherein the first section is attached to the housing and extends outwardly from the housing and from the optical aperture a first distance, wherein the second section is attached to the housing opposite the first section and extends outwardly from the housing and from the camera a second distance, wherein the first distance is greater than the second distance, wherein the first section slopes away from the housing and towards the optical aperture relative to the housing, and wherein the visor is configured such that the optical aperture is exposed to an outside environment;

a power supply connected to the camera and to the object, wherein the power supply is disposed within a second housing, and wherein the second housing is physically separated from the first housing; and a lens cap attached to the optical aperture, wherein the lens cap comprises a polycarbonate material having a diameter of about 1.5 inches or less than about 1.5 inches.

2. The traffic monitoring device of claim 1 further comprising:

a gimbal attached to the camera, wherein the gimbal is inside the housing.

3. The traffic monitoring device of claim 1 further comprising:

a negative ion generator adjacent the optical aperture.

4. The traffic monitoring device of claim 1 wherein the traffic monitoring device has a weight of less than one pound.

* * * * *